(12) United States Patent
Taomoto et al.

(10) Patent No.: US 9,975,785 B2
(45) Date of Patent: May 22, 2018

(54) DESALINATION METHOD

(71) Applicant: Panasonic Intellectual Property Management Co., Ltd., Osaka (JP)

(72) Inventors: Akira Taomoto, Kyoto (JP); Morio Tomiyama, Nara (JP); Hisaaki Gyoten, Osaka (JP); Norihisa Mino, Osaka (JP); Atsushi Ono, Kyoto (JP); Stephen William John, Kyoto (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 343 days.

(21) Appl. No.: 14/746,879

(22) Filed: Jun. 23, 2015

(65) Prior Publication Data

US 2015/0291442 A1 Oct. 15, 2015

Related U.S. Application Data

(63) Continuation of application No. PCT/JP2014/001404, filed on Mar. 12, 2014.

(30) Foreign Application Priority Data

Mar. 19, 2013 (JP) .................................. 2013-057199

(51) Int. Cl.
| | |
|---|---|
| *C02F 1/04* | (2006.01) |
| *B01D 1/00* | (2006.01) |
| *C02F 103/08* | (2006.01) |

(52) U.S. Cl.
CPC ............... *C02F 1/043* (2013.01); *B01D 1/00* (2013.01); *C02F 1/042* (2013.01); *C02F 2103/08* (2013.01); *Y02A 20/128* (2018.01)

(58) Field of Classification Search
CPC ....... C02F 1/042; C02F 1/043; C02F 2103/08; B01D 1/00
See application file for complete search history.

(56) References Cited

U.S. PATENT DOCUMENTS

| | | |
|---|---|---|
| 5,270,080 A | 12/1993 | Mino et al. |
| 8,652,303 B2 | 2/2014 | Mino et al. |
| 2011/0139600 A1* | 6/2011 | Al-Sadah ............... B01D 1/14 202/177 |
| 2012/0138448 A1 | 6/2012 | Mino et al. |

FOREIGN PATENT DOCUMENTS

| | | |
|---|---|---|
| JP | 60-13206 | 1/1985 |
| JP | 07-63670 | 7/1995 |
| WO | 2012/060036 | 5/2012 |

OTHER PUBLICATIONS

International Search Report dated Apr. 8, 2014 in International (PCT) Application No. PCT/JP2014/001404.

* cited by examiner

*Primary Examiner* — Brian A McCaig
(74) *Attorney, Agent, or Firm* — Wenderoth, Lind & Ponack, L.L.P.

(57) ABSTRACT

A desalination method includes: introducing a liquid to a reservoir layer to place the liquid above a water-repellent particle layer; heating and evaporating the liquid placed above the water-repellent particle layer to generate water vapor and deposit impurities on the sheet; liquefying the water vapor by a liquefying layer to obtain fresh water; and removing the sheet on which the impurities have been deposited from a desalination apparatus.

6 Claims, 16 Drawing Sheets

DESALINATION METHOD

CROSS REFERENCE TO RELATED APPLICATIONS

This is a continuation application of PCT International Application No. PCT/JP2014/001404 filed on Mar. 12, 2014, designating the United States of America, which is based on and claims priority of Japanese Patent Application No. 2013-057199 filed on Mar. 19, 2013. The entire disclosures of the above-identified applications, including the specifications, drawings and claims are incorporated herein by reference in their entirety.

FIELD

One or more exemplary embodiments disclosed herein relate generally to a desalination method of obtaining fresh water from a liquid.

BACKGROUND

Known techniques for generating fresh water at locations where such water is not easily available include generating fresh water from seawater. For example, WO 2012/060036 discloses a desalinating method using water-repellent particles.

Technical Problem

However, the above method has a problem that impurities are deposited over time in a surface portion of a water-repellent particle layer, thus reducing a desalination efficiency, which indicates an amount of fresh water generated per unit time.

Accordingly, the present disclosure has been made in view of the above-mentioned problem, and one non-limiting and exemplary embodiment provides a desalination method that suppresses the reduction in the desalination efficiency.

SUMMARY

Solution to Problem

In one general aspect, the techniques disclosed here feature a desalination method for obtaining fresh water from a liquid using a desalination apparatus that obtains fresh water from a liquid in which impurities are dissolved, the desalination apparatus including: a water-repellent particle layer that is located below a reservoir layer, contains a plurality of water-repellent particles, and allows passage of water vapor generated by evaporation of the liquid stored in the reservoir layer, the reservoir layer being a space for storing the liquid; a liquefying layer that is located below the water-repellent particle layer, and liquefies the water vapor that has passed through the water-repellent particle layer to obtain the fresh water; and a sheet that is disposed in a surface portion of the water-repellent particle layer, and has water permeability. The desalination method includes: introducing the liquid to the reservoir layer to place the liquid above the water-repellent particle layer; heating and evaporating the liquid placed above the water-repellent particle layer to generate water vapor; liquefying the water vapor by the liquefying layer to obtain the fresh water; determining whether or not the impurities have been deposited on the sheet; and removing the sheet from the desalination apparatus if it is determined that the impurities have been deposited.

General and specific aspect disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

The desalination method according to one or more exemplary embodiments or features disclosed herein makes it possible to suppress the reduction in the desalination efficiency.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS

In the present description, "water repellency" means a property of rejecting water.
(Underlying Knowledge Forming Basis of the Present Disclosure)

Before the description of a desalination apparatus according to an embodiment, the knowledge leading to the present disclosure will be described first with reference to a desalination apparatus in a comparative example.

Figure 1:
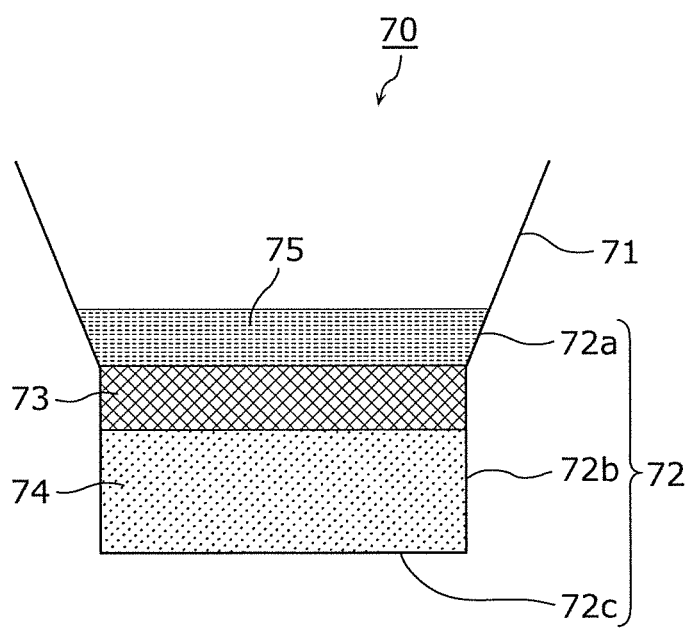
FIG. 1 is a sectional view illustrating a configuration of a desalination apparatus according to a comparative example.

FIG. 1 is a sectional view illustrating a configuration of a desalination apparatus according to a comparative example.

A desalination apparatus 70 in the comparative example is a desalination apparatus that obtains fresh water from a liquid, and includes a water tank 71, a water-repellent particle layer 73 and a liquefying layer 74 that are located in this order from above inside a vessel 72 having an upper side wall 72a, a lower side wall 72b and a base plate 72c. In the desalination apparatus 70, the liquid stored in the water tank 71 (a liquid layer 75) is evaporated to be water vapor. The water vapor passes through the water-repellent particle layer 73. The water vapor that has passed through the water-repellent particle layer 73 is liquefied in the liquefying layer 74 so as to become fresh water.

Here, the water-repellent particle layer 73 is formed of a large number of water-repellent particles that are clustered together, and the surface of one water-repellent particle is in contact with the surfaces of other water-repellent particles. Each of the water-repellent particles includes a particle and a water-repellent film coating the particle surface, and has water repellency. Also, between the water-repellent particles that are in contact with each other, the water-repellent particle layer 73 has a gap through which the water vapor obtained by evaporating the liquid can pass.

The inventors have arrived at the following knowledge: in such a desalination apparatus, impurities are deposited in the surface portion of the water-repellent particle layer as time passes, namely, as the liquid in the water tank is evaporated to be the water vapor. These deposited impurities cause the reduction of desalination efficiency. More specifically, the impurities deposited in the surface portion of the water-repellent particle layer at least partially cover an interface between the water tank and the water-repellent particle layer. As a result, the passability of the water vapor from the water tank to an inner portion of the water-repellent particle layer decreases, causing the reduction of desalination efficiency.

Thus, if the desalination efficiency is to be maintained in the desalination apparatus 70 in the comparative example, it is necessary to remove the deposited impurities.

However, the impurities are deposited over substantially the entire surface portion of the water-repellent particle layer 73, and it is difficult to efficiently remove the deposited impurities for the following reasons. That is, since the deposited impurities firmly adhere to the water-repellent particles that are in contact with these impurities, the water-repellent particles have to be removed together with the impurities. However, with the water-repellent particles coming apart easily, at the time of removing the deposited impurities and the water-repellent particles, the impurities firmly adhering to the water-repellent particles that come apart and remain in the desalination apparatus 70 also remain in the desalination apparatus 70.

As described above, in the desalination apparatus 70 according to the comparative example, it is difficult to efficiently remove the deposited impurities, causing a problem of reduced desalination efficiency.

Accordingly, the inventors have arrived at an invention capable of efficiently removing the deposited impurities so as to suppress the decrease in the passability of the water vapor from the liquid layer 75 to the inner portion of the water-repellent particle layer and thus suppress the reduction of desalination efficiency.

In other words, a desalination apparatus according to an exemplary embodiment disclosed herein is a desalination apparatus that obtains fresh water from a liquid in which impurities are dissolved. The desalination apparatus includes: a water-repellent particle layer that is located below a reservoir layer, contains a plurality of water-repellent particles, and allows passage of water vapor generated by evaporation of the liquid stored in the reservoir layer, the reservoir layer being a space for storing the liquid; a liquefying layer that is located below the water-repellent particle layer, and liquefies the water vapor that has passed through the water-repellent particle layer to obtain the fresh water; and a sheet that is disposed in the water-repellent particle layer, and has water permeability.

In this way, by removing the sheet from the desalination apparatus, it is possible to efficiently collect the deposited impurities. Consequently, it is possible to suppress the decrease in the desalination efficiency.

Furthermore, for example, the sheet may have a lattice shape defining through holes passing through the sheet in a thickness direction, and the through holes may have a dimension greater than 100 μm and less than 10 mm.

This makes it possible to suppress the decrease in the desalination efficiency caused by providing the sheet and efficiently remove the deposited impurities.

Also, for example, the sheet may be disposed in a portion of the water-repellent particle layer other than a surface portion of the water-repellent particle layer, the surface portion facing the reservoir layer.

This makes it possible to reduce the possibility that the water-repellent particles to which the impurities adhere may remain in the desalination apparatus, thereby further suppressing the decrease in the desalination efficiency.

Moreover, for example, the sheet may have a specific gravity less than or equal to a specific gravity of the liquid when a concentration of the impurities equals a saturation concentration. The desalination apparatus may further include a restriction member that restricts movement of at least a portion of a periphery of the sheet. The sheet may have a specific gravity greater than a specific gravity of the liquid when a concentration of the impurities equals a saturation concentration.

In this manner, even in the case where the impurities are deposited in the reservoir layer, namely, where the concentration of the impurities dissolved in the liquid stored in the reservoir layer equals the saturation concentration, it is possible to suppress the possibility that the sheet may float up in the liquid stored in the reservoir layer.

It should be noted that these generic aspects or specific aspects may be implemented as a desalination system including the desalination apparatus described above.

In other words, a desalination system according to one aspect of the present disclosure includes the desalination apparatus according to any of the above-described aspects; and a determining unit configured to determine whether or not the impurities have been deposited on a surface of the water-repellent particle layer.

In this manner, by determining that the impurities are deposited, timing of removing the sheet can be detected. Thus, it becomes possible to collect the sheet at appropriate timing, thus suppressing the decrease in the desalination efficiency.

Furthermore, for example, the desalination system described above may further include an imaging unit configured to capture an image of the surface of the water-repellent particle layer. The determining unit may be configured to determine whether or not the impurities have been deposited on the surface of the water-repellent particle layer using the image captured by the imaging unit.

It should be appreciated that these generic or specific aspects may be implemented as a desalination method that uses the desalination apparatus described above to obtain fresh water from a liquid.

These general and specific aspects may be implemented using a system, a method, an integrated circuit, a computer program, or a computer-readable recording medium such as a CD-ROM, or any combination of systems, methods, integrated circuits, computer programs, or computer-readable recording media.

Hereinafter, certain exemplary embodiments are described in greater detail with reference to the accompanying Drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

[Desalination Apparatus]

Figure 2:
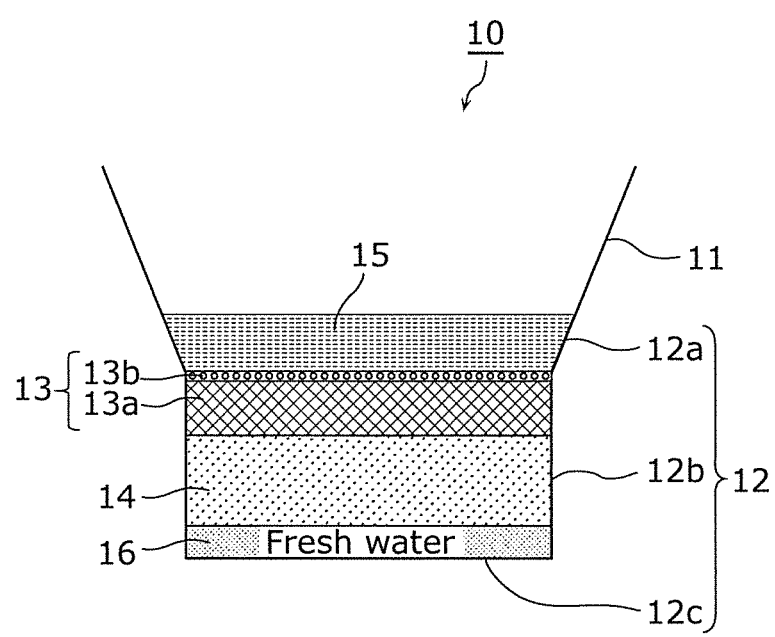
FIG. 2 is a sectional view illustrating a configuration of a desalination apparatus according to Embodiment 1.

The following describes a desalination apparatus 10 with a basic configuration and a desalination process thereof with reference to the drawings before describing a desalination system according to an embodiment. FIG. 2 is a sectional view illustrating a configuration of the desalination apparatus 10.

The desalination apparatus 10 shown in FIG. 2 includes a water tank 11, a water-repellent particle layer 13 and a liquefying layer 14. The water tank 11, the water-repellent particle layer 13 and the liquefying layer 14 are located in this order from above. Here, the water tank 11 has a lateral surface surrounded by an upper side wall 12a of a vessel 12 and a bottom surface covered with the water-repellent particle layer 13, such that a space for storing a liquid (a reservoir layer) is defined therein.

<Water Tank 11>

The water tank 11 may have any shape such as a rectangle or a circle when seen in a plan view (a top view). The lateral surface of the water tank 11 is formed of the upper side wall 12a of the vessel 12, and the bottom surface thereof is formed of an upper surface of the water-repellent particle layer 13.

Here, the vessel 12 will be described. The vessel 12 shown in FIG. 2 includes a lower side wall 12b that extends vertically, the upper side wall 12a that is connected to the lower side wall 12b and inclined so as to expand upwardly, and a base plate 12c that is connected to the lower side wall 12b. The upper side wall 12a is not necessarily inclined so as to expand upwardly, but may extend vertically similarly to the lower side wall 12b. However, since the upper side wall 12a sometimes corresponds to a flow channel of a liquid when the liquid is introduced to the water tank 11, it is favorable that the upper side wall 12a be inclined so as to expand upwardly in order to reduce energy of the liquid to be introduced to the water tank 11.

The vessel 12 is formed such that the upper side wall 12a, the lower side wall 12b and the base plate 12c surround surfaces other than an upper surface of the water tank 11.

In a lower portion of the vessel 12, lateral portions of the water-repellent particle layer 13 and the liquefying layer 14 described later are entirely surrounded by the lower side wall 12b, and a bottom surface of the liquefying layer 14 is held by the base plate 12c. The vessel 12 allows fresh water obtained by desalination to be held in the liquefying layer 14.

Each of the lower side wall 12b and the upper side wall 12a is formed of a water repellent material. An exemplary material for each of the lower side wall 12b and the upper side wall 12a is a metal sheet, concrete, a waterproof sheet or clay.

As described above, the vessel 12 has a shape of a bottomed tube, includes the upper side wall 12a that has a tubular shape whose upper opening is larger than its lower opening, the lower side wall 12b that has a tubular shape whose upper opening contacts the lower opening of the upper side wall 12a, and the base plate 12c that closes a lower opening of the lower side wall 12b, and receives the water tank 11, the water-repellent particle layer 13 and the liquefying layer 14 therein. Incidentally, the vessel 12 is not limited to the shape of a bottomed tube, but may be provided, for example, as a recessed portion dug in the ground, in which the water tank 11, the water-repellent particle layer 13 and the liquefying layer 14 are located. Also, the lower side wall 12b and the upper side wall 12a are not limited to have a water repellency but may have a water proof property.

The liquid poured (introduced) into the water tank 11 forms the liquid layer 15 in the water tank 11. In other words, the liquid forms the liquid layer 15 above the upper surface of the water-repellent particle layer 13 and inside the vessel 12 (a space surrounded by the upper side wall 12a).

It is noted that the desalination apparatus 10 may have an introduction passage for introducing the liquid to the water tank 11. On the other hand, when the desalination apparatus 10 does not have the introduction passage, the liquid may be introduced into the water tank 11 from an opening of the water tank 11 (an opening of the vessel 12). Here, the liquid to be introduced to the water tank 11 is transparent or translucent, for example.

The liquid that has been poured into the water tank 11 and formed the liquid layer 15 does not fall down to the liquefying layer 14 because the water-repellent particle layer 13 and the upper side wall 12a have water repellency. In other words, the liquid that has been poured into the water tank 11 is overlaid on the upper surface of the water-repellent particle layer 13 whose perimeter is surrounded by the upper side wall 12a, and maintained as the liquid layer 15. The height of the liquid layer 15 (a liquid level of the liquid layer 15) is, for example, 1 mm to 50 cm. When the height of the liquid layer 15 is too great (for example, larger than 50 cm), it takes time to heat the liquid as described later. Thus, a great amount of heat capacity is needed, resulting in decreased efficiency of desalinating the liquid. On the other hand, when the height of the liquid layer 15 is too small (for example, smaller than 1 mm), the efficiency of desalinating the liquid is excessively reduced. Accordingly, the height of the liquid layer 15 within the above-noted numerical range makes it possible to keep an appropriate desalination efficiency.

As described above, the lateral surface of the water tank 11 is formed of the upper side wall 12a of the vessel, and the bottom surface thereof is formed of the water-repellent particle layer 13. The water tank 11 holds as the liquid layer 15 the liquid that has been introduced from an outside of the desalination apparatus 10.

It should be noted that the water tank 11 may include a heater for heating the liquid layer 15 in the water tank 11. In this case, the heater is disposed on the upper side wall 12a of the water tank 11, for example.

<Water-Repellent Particle Layer 13>

The water-repellent particle layer 13 is located below the water tank 11. The upper surface of the water-repellent particle layer 13 forms the bottom surface of the water tank 11. When the liquid is poured into the water tank 11, the water-repellent particle layer 13 is located in contact with the lower surface of the liquid layer 15. As shown in FIG. 2, a lateral surface of the water-repellent particle layer 13 may be surrounded by the lower side wall 12b.

The water-repellent particle layer 13 contains at least a plurality of water-repellent particles. Each of the water-repellent particles includes a particle and a water-repellent film that coats a particle surface. The water-repellent particles are particles whose surfaces have water repellency.

The water-repellent particle layer 13 is formed of a large number of the water-repellent particles that are clustered together. In other words, the surface of one water-repellent particle is in contact with the surfaces of other water-repellent particles. At this time, between the water-repellent particles that are in contact with each other, the water-repellent particle layer 13 has a gap through which the water vapor obtained by heating and evaporating the liquid can pass. Since the water-repellent particle layer 13 includes the plurality of water-repellent particles, it is possible to reduce the liquid entering the inside of the water-repellent particle layer 13.

The lower side wall 12b may surround the lateral surface of the water-repellent particle layer 13 entirely. By doing so, it becomes possible to reduce the liquid entering the inside of the water-repellent particle layer 13. Since the plurality of water-repellent particles forming the water-repellent particle layer 13 also have water repellency and thus can reduce the liquid entering the inside of the water-repellent particle layer 13, it is not essential to provide the lower side wall 12b.

The particles include gravel, sand, silt and clay. The gravel corresponds to particles having a particle size of greater than 2 mm and not greater than 75 mm. The sand corresponds to particles having a particle size of greater than 0.075 mm and not greater than 2 mm. The silt corresponds to particles having a particle size of greater than 0.005 mm and not greater than 0.075 mm. The clay corresponds to particles having a particle size of not greater than 0.005 mm.

The water-repellent film coats the surface of each of the particles. The water-repellent film may include a fluorocarbon group represented by the chemical formula $-(CF_2)_n-$. Here, n is a natural number. For example, n ranges from 2 to 20.

The water-repellent film may be bound to the particle by a covalent bond. The following chemical formula (I) represents a favorable water-repellent film.

[Formula 1]

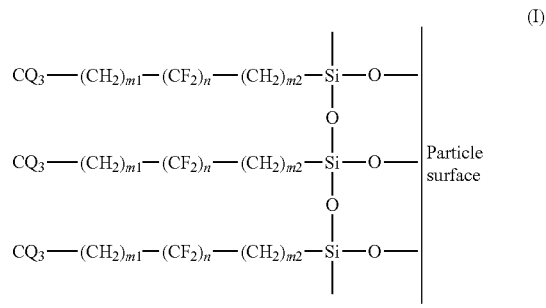

Here, Q represents hydrogen or fluorine. m1 and m2 represent zero or a natural number of not less than one, independently. Further, n ranges from 2 to 20.

In the following, an exemplary method for producing the water-repellent particles will be described.

First, a surfactant represented by the chemical formula $CX_3-(CH_2)_{m1}-(CF_2)_n-(CH_2)_{m2}-SiX_3$ is dissolved in a non-aqueous solvent to prepare a surfactant solution. X is halogen, optionally, chlorine.

Next, a plurality of particles are immersed in the surfactant solution in dry atmosphere to obtain a plurality of water-repellent particles (see Patent Literature: U.S. Pat. No. 5,270,080 (corresponding to Japanese Examined Patent Application Publication No. 07-063670)).

Furthermore, examples of the material for the water-repellent film include chlorosilane materials or alkoxysilane materials. The chlorosilane materials are, for example, heptadecafluoro-1,1,2,2-tetrahydrodecyltrichlorosilane or n-octadecyldimethylchlorosilane. The alkoxysilane materials are, for example, n-octadecyltrimethoxysilane or nonafluorohexyltriethoxysilane.

The water-repellent particle layer 13 may have low thermal conductivity so that heat conduction between the water tank 11 and the liquefying layer 14 is reduced. In the water tank 11, the liquid is heated and evaporated. Accordingly, the water tank 11 is kept at a predetermined temperature or higher (for example, from 40° C. to 80° C.). The liquefying layer 14 liquefies the water vapor. Accordingly, the liquefying layer 14 is kept at a predetermined temperature or lower (for example, 30° C. or lower). The difference in temperature between the water tank 11 and the liquefying layer 14 is at least 10° C. When the difference in temperature between the water tank 11 and the liquefying layer 14 is considerable and the thermal conductivity therebetween is high, the desalination efficiency may be reduced in some cases.

Since the water-repellent particle layer 13 is formed of the plurality of water-repellent particles that are clustered together, air is present between the plurality of particles. Thus, the water-repellent particle layer 13 has lower thermal conductivity than a film or the like formed of a uniform material.

The thickness of the water-repellent particle layer 13 is, for example, from 5 mm to 30 cm.

When the water-repellent particle layer 13 is too thin (e.g., has a thickness of less than 5 mm), there is a possibility that the water poured in the water tank 11 may fall down to the liquefying layer 14. On the other hand, the water-repellent particle layer 13 is too thick (e.g., has a thickness of greater than 30 cm), the water vapor described later cannot easily pass through the gap between particles in the water-repellent particle layer 13.

<Liquefying Layer 14>

The liquefying layer 14 is located below the water-repellent particle layer 13. The liquefying layer 14 may be formed of a plurality of particles including particles that have not been treated to be water repellent. Alternatively, the liquefying layer 14 may be a space surrounded by the lower side wall 12b and the base plate 12c.

The lateral portion of the liquefying layer 14 may be entirely surrounded by the lower side wall 12b and the bottom portion thereof may be covered with the base plate 12c, so that the vessel 12 can hold fresh water 16.

The water vapor that has left the water-repellent particle layer 13 and reached the liquefying layer 14 after passing through the gap between the particles in the water-repellent particle layer 13 is liquefied in the liquefying layer 14 to become liquid water (fresh water 16). Details will be described later.

The liquefying layer 14 is cooled as necessary.

An exemplary cooling method is illustrated as follows. The liquefying layer 14 is cooled by placing at least a part of the liquefying layer 14 in the soil (in the ground). For example, the height of the interface between the liquefying layer 14 and the water-repellent particle layer 13 is brought to the same level as the earth's surface, thereby making the temperature of the liquefying layer 14 lower than that of the water-repellent particle layer 13.

Also, the liquefying layer 14 may include a cooling unit.

As described above, the liquefying layer 14 is located immediately below the water-repellent particle layer 13, and liquefies by cooling the water vapor that has passed through the water-repellent particle layer 13. Here, the liquefying layer 14 is kept at a predetermined temperature or lower (for example, 15° C. or lower).

It should be noted that, at the interface between the liquefying layer 14 and the water-repellent particle layer 13, the desalination apparatus 10 may include a support layer such as a mesh, for example, for avoiding easy falling of the water-repellent particles in the water-repellent particle layer down to the liquefying layer 14.

[Characteristic Configuration of Desalination Apparatus]

In the following, the characteristic configuration of the desalination apparatus according to the present embodiment will be described with reference to FIG. 2 to FIG. 4B.

As illustrated in FIG. 2, the water-repellent particle layer 13 in the desalination apparatus 10 according to the present embodiment specifically includes a particle layer 13a and an impurity collecting sheet 13b.

Figure 3:
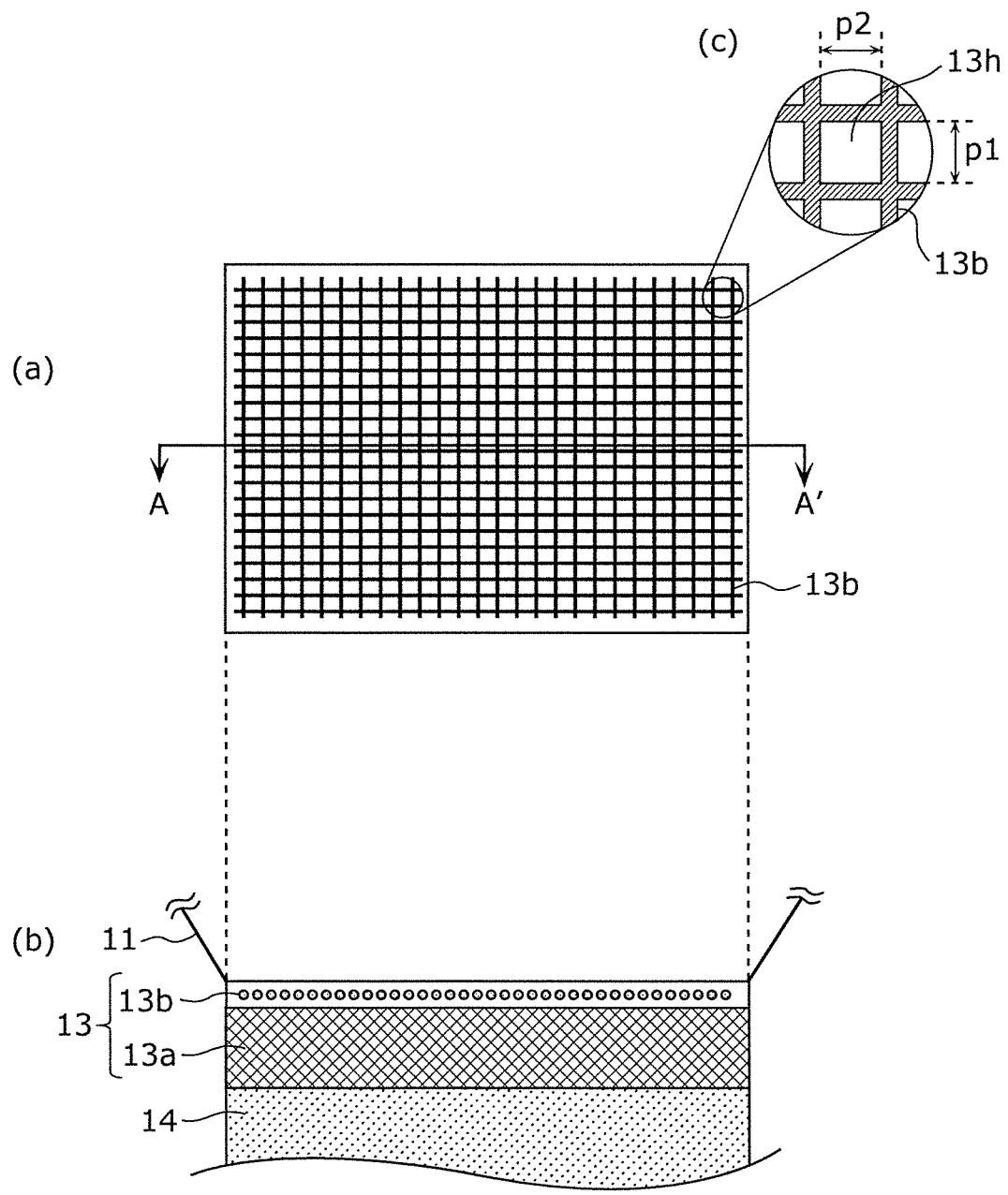
FIG. 3 illustrates a detailed configuration of the desalination apparatus according to Embodiment 1.

FIG. 3 illustrates a detailed configuration of the desalination apparatus 10 according to Embodiment 1, in which (a) is a plan view illustrating the water-repellent particle layer 13, (b) is a sectional view illustrating the water-repellent particle layer 13 taken along line A-A' in (a), and (c) is a partially enlarged plan view illustrating the impurity collecting sheet 13b. It should be noted that (b) in FIG. 3 also illustrates a portion of the water tank 11 and a portion of the liquefying layer 14.

As illustrated in FIG. 2 and FIG. 3, the particle layer 13a is located at a lower side of the water-repellent particle layer 13, and contains a plurality of water-repellent particles. In other words, a gap through which water vapor passes and the liquid does not pass is formed between adjacent ones of the plurality of water-repellent particles. Accordingly, the particle layer 13a does not allow passage of the liquid and allows passage of the water vapor generated by evaporation of the liquid.

The impurity collecting sheet 13b is disposed in a surface portion of the water-repellent particle layer 13, and has water permeability.

Herein, the water permeability means a property of transmitting a liquid and water vapor, for example. With such an impurity collecting sheet 13b, the desalination apparatus 10 according to the present embodiment can efficiently collect the deposited impurities. The reason why the deposited impurities can be collected efficiently by providing the impurity collecting sheet 13b will be described later.

This impurity collecting sheet 13b is removable from the desalination apparatus 10. More specifically, as illustrated in (c) of FIG. 3, the impurity collecting sheet 13b has a lattice shape defining through holes 13h passing through the impurity collecting sheet 13b in a thickness direction. The dimension of the through holes 13h is greater than 100 µm and less than 10 mm. More specifically, when the dimension of the through holes 13h is indicated as p1×p2, lengthwise by crosswise, 100 µm<p1<10 mm and 100 µm<p2<10 mm.

Furthermore, the impurity collecting sheet 13b is disposed on the particle layer 13a. It should be noted that, depending on the dimensional relationship between a particle diameter of each of the water-repellent particles forming the particle layer 13a and the dimension of the through hole 13h of the impurity collecting sheet 13b, the water-repellent particles may be located in the through hole 13h of the impurity collecting sheet 13b.

Now, the following is a description of the reason why the deposited impurities can be collected efficiently by disposing the impurity collecting sheet 13b.

Figure 4A:
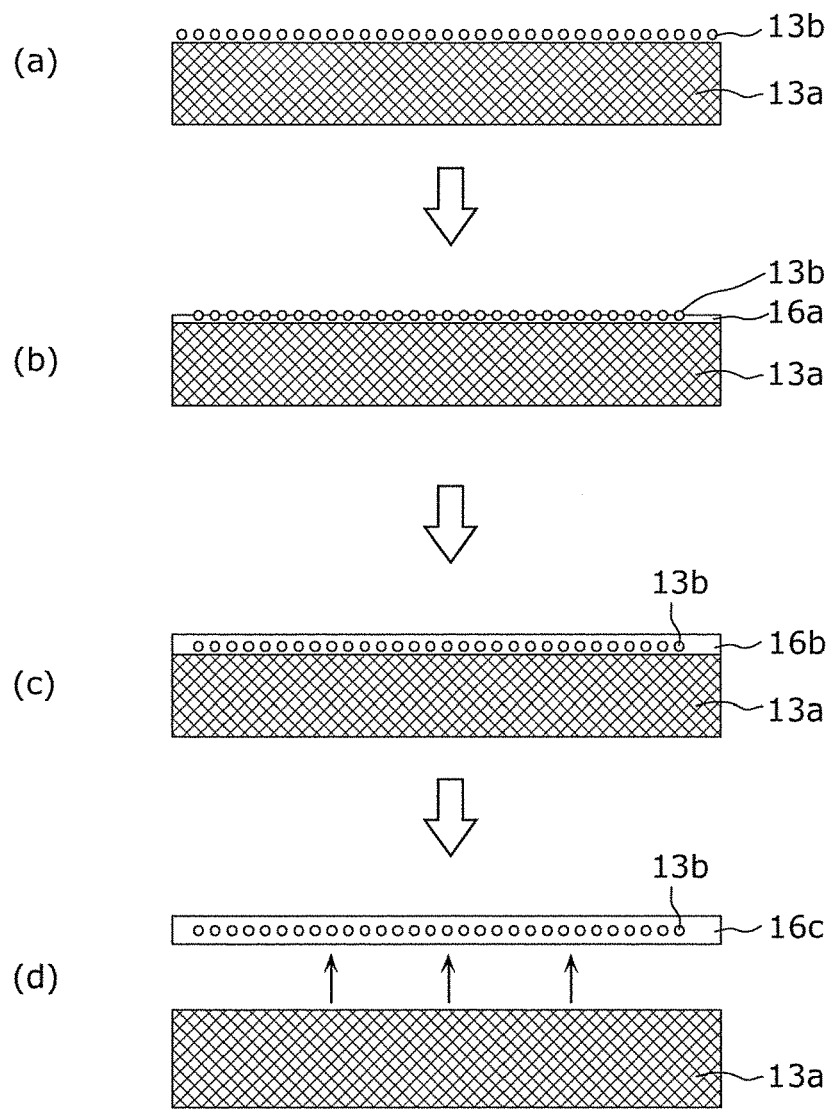
FIG. 4A illustrates processes in which impurities are deposited and collected in the desalination apparatus according to Embodiment 1.

FIG. 4A illustrates processes in which the impurities are deposited and collected in the desalination apparatus 10 according to Embodiment 1. This figure is an enlarged sectional view illustrating the vicinity of an interface between the water tank 11 and the water-repellent particle layer 13 in the desalination apparatus 10.

First, as illustrated in (a) of FIG. 4A, no impurities are deposited when an impurity concentration of the liquid layer 15 is lower than or equal to a saturation concentration. For example, when the liquid layer 15 is formed by introducing the liquid into the water tank 11 of the desalination apparatus 10, the impurity concentration of the liquid layer 15 is lower than or equal to the saturation concentration, so that the impurities are not deposited.

Thereafter, as illustrated in (b) of FIG. 4A, impurities 16a are deposited over time in the through holes 13h (opening portions) of the impurity collecting sheet 13b. More specifically, as the desalination process proceeds, moisture in the liquid layer 15 passes through the water-repellent particle layer 13, raising the impurity concentration of the liquid layer 15. Also, the moisture in the liquid layer 15 is evaporated upwards, thereby raising the impurity concentration of the liquid layer 15. Then, when the impurity concentration of the liquid layer 15 exceeds the saturation concentration, the impurities 16a are deposited.

Thereafter, with the further passage of time, as illustrated in (c) of FIG. 4A, impurities 16b are deposited so as to cover the impurity collecting sheet 13b. As time passes further, the thickness of the impurities 16b that are deposited so as to cover the impurity collecting sheet 13b increases.

Then, after (c) of FIG. 4A, by removing the impurity collecting sheet 13b as illustrated in (d) of FIG. 4A, it is possible to also remove impurities 16c that are deposited so as to cover the impurity collecting sheet 13b. In other words, the impurities 16c can be collected.

Here, since the through holes 13h of the impurity collecting sheet 13b have a dimension greater than 100 μm and less than 10 mm as described above, the following effects are produced. That is, if the dimension of the through holes 13h is less than or equal to 100 μm, a region in which the particle layer 13a can be visually identified is considerably small in plan view from above the water-repellent particle layer 13. In other words, the area of the interface between the liquid and the particle layer 13a is considerably small. Consequently, there is a possibility that the desalination efficiency of the desalination apparatus 10 may decrease. On the other hand, if the dimension of the through holes 13h is greater than or equal to 10 mm, the deposited impurities may fall down from the through holes 13h to the particle layer 13a at the time of collecting the deposited impurities. In other words, the deposited impurities cannot be removed efficiently. Thus, by providing the through holes 13h having a dimension of 100 μm<p<10 mm, it is possible to suppress the decrease in the desalination efficiency caused by the presence of the impurity collecting sheet 13b and remove the deposited impurities efficiently.

Figure 4B:
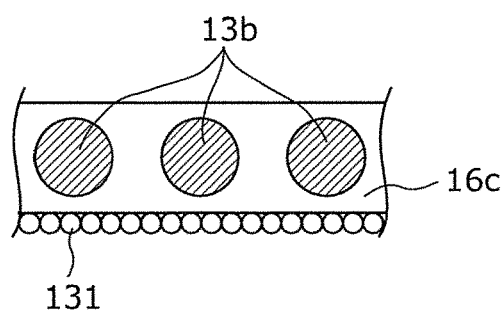
FIG. 4B is a drawing for detailing the process of collecting the impurities illustrated in (d) of FIG. 4A.

Now, when the impurity collecting sheet 13b is removed as illustrated in (d) of FIG. 4A, a portion of the plurality of water-repellent particles 131 forming the particle layer 13a is sometimes removed together with the deposited impurities 16c. FIG. 4B is a drawing for detailing the process of collecting the impurities illustrated in (d) of FIG. 4A, and is an enlarged sectional view illustrating the impurity collecting sheet 13b and the impurities 16c. As mentioned above, when the impurity collecting sheet 13b is removed (see (d) of FIG. 4A), a portion of the plurality of water-repellent particles 131 in the particle layer 13a is sometimes collected together with the deposited impurities 16c. This is particularly noticeable in the case where the impurities are deliquescent (where the liquid is seawater or the like, for example).

Also, the impurity collecting sheet 13b has a greater specific gravity than the liquid when the impurity concentration equals the saturation concentration. In other words, the impurity collecting sheet 13b has a greater specific gravity than the liquid layer 15 when the impurity concentration equals the saturation concentration.

In this manner, even when the impurities are deposited in the water tank 11 as illustrated in (b) and (c) of FIG. 4A, namely, the concentration of the impurities dissolved in the liquid in the liquid layer 15 equals the saturation concentration, it is possible to suppress the possibility that the impurity collecting sheet 13b may float up to the liquid layer 15. Here, the specific gravity of the impurity collecting sheet 13b refers to a specific gravity of a material forming this impurity collecting sheet 13b.

For example, when the liquid is salt water, since a saturated saline solution has a specific gravity of about 1.2, the impurity collecting sheet 13b may be formed of a polycarbonate resin or a polyurethane resin having a specific gravity of 1.2, a polyacetal resin having a specific gravity of 1.4, a polyethylene terephthalate (PET) resin having a specific gravity of 1.29 to 1.40, a rigid polyvinyl chloride (PVC) resin having a specific gravity of 1.30 to 1.58, a fluorocarbon resin having a specific gravity of 1.77 to 2.20, a glass material having a specific gravity of about 2.5, a ceramic material having a specific gravity of 3.9 such as alumina, or a metallic material having a specific gravity of 7.7 to 8.0 such as stainless steel.

As described above, the desalination apparatus 10 according to the present embodiment is a desalination apparatus that obtains fresh water from a liquid in which impurities are dissolved. The desalination apparatus 10 includes: the water-repellent particle layer 13 that is located below the water tank 11 (reservoir layer), contains a plurality of water-repellent particles, and allows passage of water vapor generated by evaporation of the liquid layer 15 (liquid) stored in the water tank 11, the water tank 11 being a space for storing the liquid; the liquefying layer 14 that is located below the water-repellent particle layer 13, and liquefies the water vapor that has passed through the water-repellent particle layer 13 to obtain the fresh water; and the impurity collecting sheet 13b that is disposed in the water-repellent particle layer 13, and has water permeability.

In this way, the desalination apparatus 10 according to the present embodiment can efficiently collect the deposited impurities. Consequently, it is possible to suppress the decrease in the desalination efficiency.

In the embodiment described above, the impurity collecting sheet 13b has had a lattice shape. However, there is no particular limitation to this. The impurity collecting sheet 13b may be any porous sheet and, for example, may have a mesh shape defining through holes that pass through the sheet in the thickness direction and have a substantially circular shape, a substantially elliptical shape, a semi-circular shape, a polygonal shape or the like in plan view, or may be a nonwoven fabric.

(Variation of Embodiment 1)

Although the impurity collecting sheet 13b has had a greater specific gravity than the liquid when the impurity concentration equals the saturation concentration in the above description, there is no particular limitation to this. That is, the impurity collecting sheet 13b may have a specific gravity less than or equal to a specific gravity of the liquid when the impurity concentration equals the saturation concentration. Compared with the case of Embodiment 1, the desalination apparatus may further include at least one restriction member that restricts movement of at least a portion of a periphery of the impurity collecting sheet.

Figure 5:
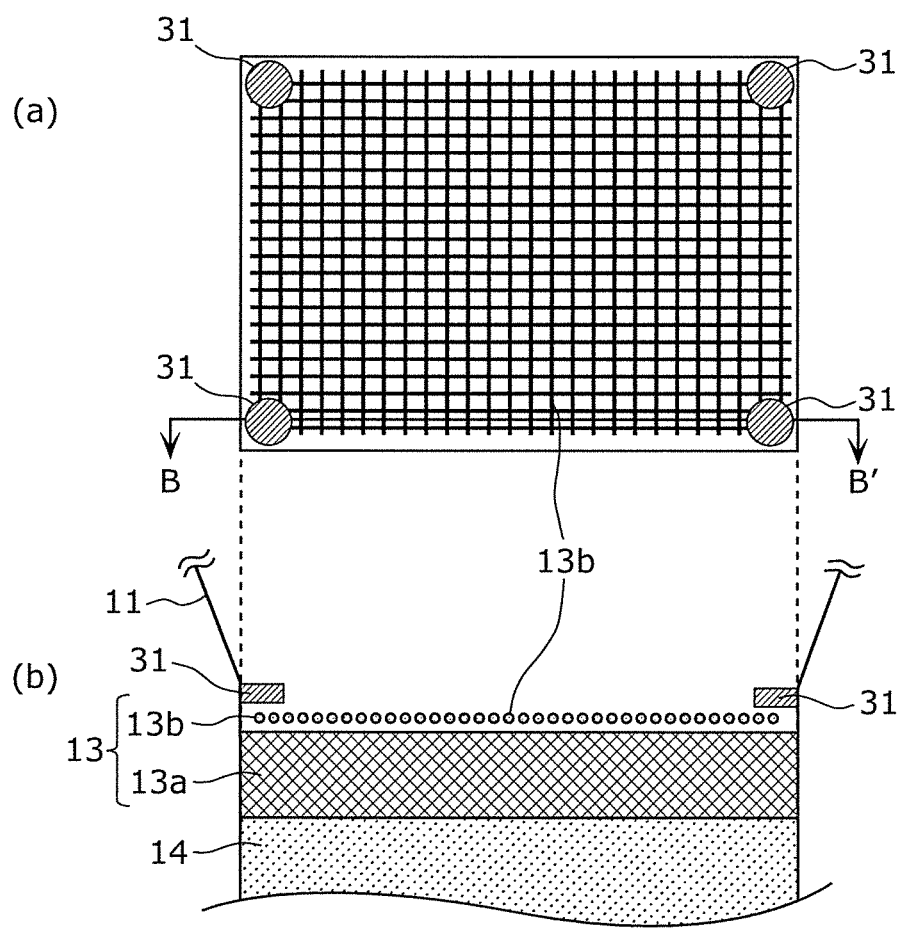
FIG. 5 illustrates a detailed configuration of a desalination apparatus according to Variation of Embodiment 1.

Hereinafter, the desalination apparatus according to Variation of Embodiment 1 will be described with reference to FIG. 5. FIG. 5 illustrates a detailed configuration of the desalination apparatus according to the present variation, in which (a) is a plan view illustrating the restriction members and the water-repellent particle layer 13 and (b) is a sectional view illustrating the restriction members and the water-repellent particle layer 13 taken along line B-B' in (a). It should be noted that (b) in FIG. 5 also illustrates a portion of the water tank 11 and a portion of the liquefying layer 14.

Compared with the desalination apparatus 10 according to Embodiment 1, the desalination apparatus according to the present variation illustrated in FIG. 5 has the impurity collecting sheet 13b having a specific gravity less than or equal to the specific gravity of the liquid when the impurity concentration equals the saturation concentration, and further includes restriction members 31 that restrict the movement of at least a portion of the periphery of the impurity collecting sheet 13b. These restriction members 31 may be, for example, weights that hold down four corners of the impurity collecting sheet 13b. This makes it possible to suppress the possibility that the impurity collecting sheet 13b may float up to the liquid layer 15.

In this manner, by using the restriction members 31 to hold down the periphery of the impurity collecting sheet 13b having a specific gravity less than or equal to the specific gravity of the liquid when the impurity concentration equals the saturation concentration, the impurity collecting sheet 13b floats in the liquid in a portion other than the periphery that is held down by the restriction members 31. Thus, when the liquid is introduced into the water tank 11, the flow speed of this liquid causes the impurity collecting sheet 13b to slightly move in the horizontal direction. As a result, the deposited impurities can be made to adhere to the impurity collecting sheet 13b more effectively.

Figure 6:
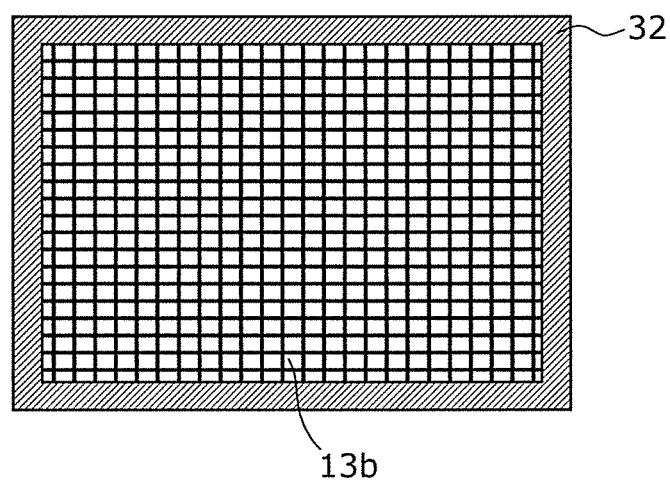
FIG. 6 is a plan view illustrating another example of a structure of a restriction member.

It should be noted that the restriction members do not have to have the configuration described above, but may have a frame shape as a restriction member 32 illustrated in FIG. 6, for example. The restriction member 32 illustrated in FIG. 6 has a frame shape and holds down the periphery of the impurity collecting sheet 13b.

Embodiment 2

A desalination apparatus according to the present embodiment is substantially the same as the desalination apparatus according to Embodiment 1 except that the impurity collecting sheet is disposed in an inner portion of the water-repellent particle layer. By disposing the impurity collecting sheet in the inner portion of the water-repellent particle layer as above, the desalination apparatus according to the present embodiment can suppress the possibility that the water-repellent particles to which the impurities adhere may remain in the desalination apparatus, making it possible to further suppress the decrease in the desalination efficiency. In the following, referring to FIG. 7, FIG. 8A, and FIG. 8B, the desalination apparatus according to the present embodiment will be detailed while focusing on the point different from the desalination apparatus according to Embodiment 1.

Figure 7:
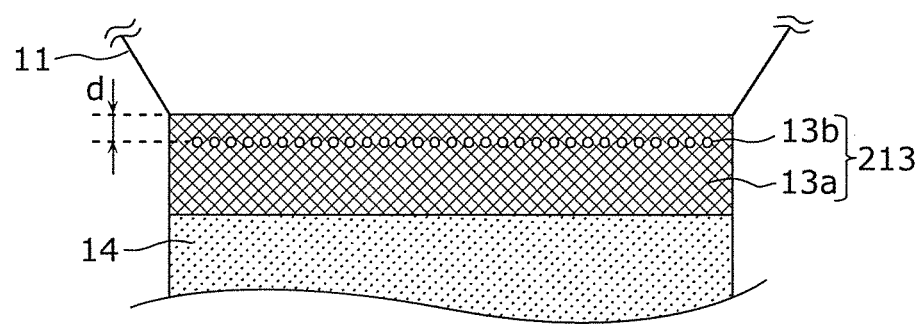
FIG. 7 is a partially enlarged sectional view illustrating a configuration of a desalination apparatus according to Embodiment 2.

FIG. 7 is a partially enlarged sectional view illustrating a configuration of a desalination apparatus according to Embodiment 2.

As illustrated in this figure, the desalination apparatus according to the present embodiment is different from the desalination apparatus illustrated in (a) of FIG. 3 in the position of the impurity collecting sheet 13b. More specifically, in the desalination apparatus according to the present embodiment, the impurity collecting sheet 13b is disposed in the inner portion of a water-repellent particle layer 213. In other words, the impurity collecting sheet 13b is disposed in a portion of the water-repellent particle layer 213 other than the surface portion that faces the water tank 11 (the reservoir layer). In other words, the impurity collecting sheet 13b is disposed inside the particle layer 13a.

More specifically, the impurity collecting sheet 13b is disposed at a depth d from the surface of the water-repellent particle layer 213. This depth d ranges, for example, from 1 mm to 10 mm.

Figure 8A:
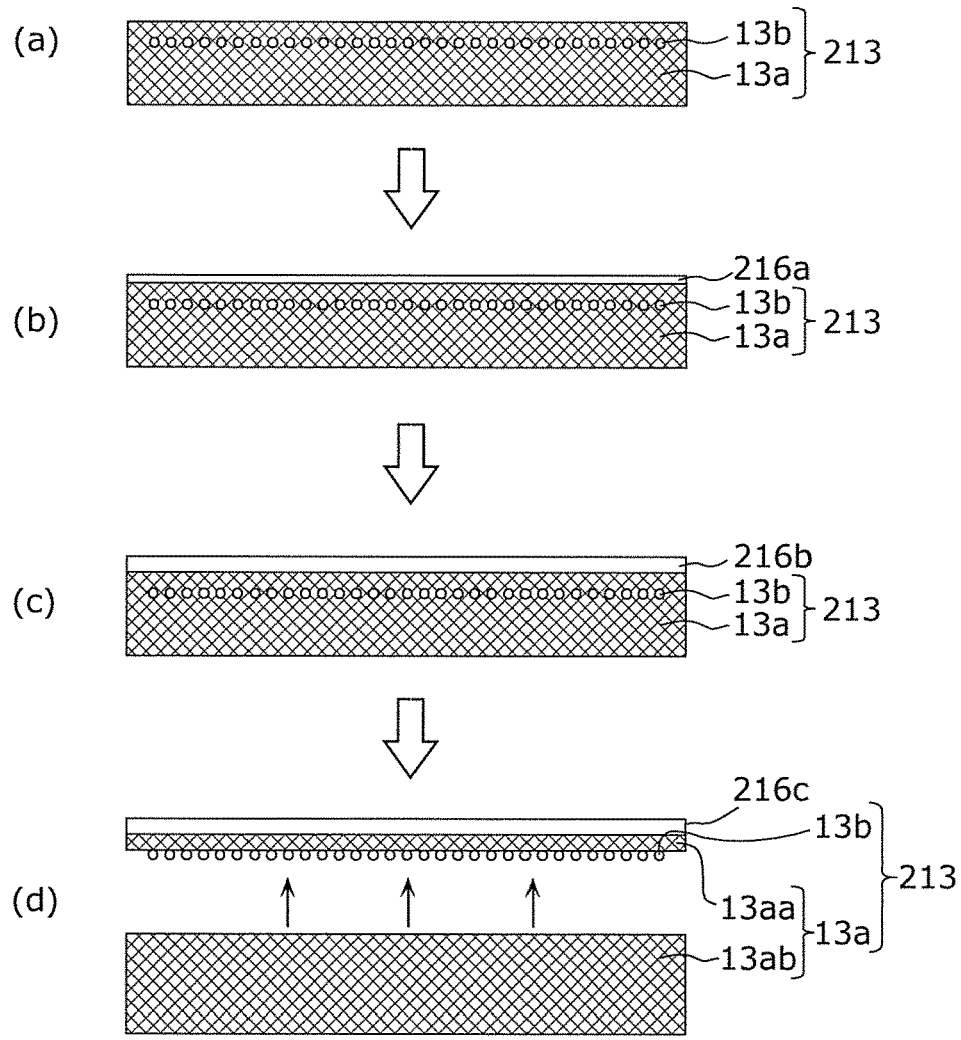
FIG. 8A illustrates processes in which impurities are deposited and collected in the desalination apparatus according to Embodiment 2.

FIG. 8A illustrates processes in which the impurities are deposited and collected in the desalination apparatus according to Embodiment 2. This figure is an enlarged sectional view illustrating the vicinity of an interface between the water tank 11 and the water-repellent particle layer 213 in the desalination apparatus.

First, as illustrated in (a) of FIG. 8A, no impurities are deposited when the impurity concentration of the liquid layer 15 is lower than or equal to the saturation concentration. For example, when the liquid layer 15 is formed by introducing the liquid to the water tank 11 of the desalination apparatus, the impurity concentration of the liquid layer 15 is lower than or equal to the saturation concentration, so that the impurities are not deposited.

Thereafter, as illustrated in (b) of FIG. 8A, impurities 216a are deposited over time on the particle layer 13a. When (b) of FIG. 8A is compared with (b) of FIG. 4A, the desalination apparatus according to the present embodiment is different from the desalination apparatus 10 according to Embodiment 1: the impurities 216a are deposited on the particle layer 13a, whereas the impurities 16a have been deposited in the through holes 13h (the opening portions) of the impurity collecting sheet 13b as illustrated in (b) of FIG. 4A.

Thereafter, with the further passage of time, as illustrated in (c) of FIG. 8A, the thickness of the deposited impurities 216b increases.

Then, after (c) of FIG. 8A, by removing the impurity collecting sheet 13b as illustrated in (d) of FIG. 8A, it is possible to also remove impurities 216c that are deposited on the particle layer 13a. In other words, the impurities 216c can be collected.

Here, in the desalination apparatus according to the present embodiment, since the impurity collecting sheet 13b is disposed inside the particle layer 13a, the following effects are produced.

Since the particle layer 13a is formed of a large number of water-repellent particles that are clustered together, water vapor passes but the liquid does not pass through the particle layer 13a in the first place as described earlier. However, as time passes since the liquid is introduced into the water tank 11 to form the liquid layer 15, namely, with the passage of time during which the surface of the particle layer 13a is covered with the liquid, the liquid gradually enters downwards from the surface of the particle layer 13a in some cases.

This is because water-repellent films of the water-repellent particles forming the particle layer 13a are deteriorated, leading to the reduced water repellency of the water-repellent particles. Such deterioration of the water-repellent films is caused, for example, when, owing to the introduction of the liquid to the water tank 11, the water-repellent particles move so that the water-repellent films of the adjacent water-repellent particles get rubbed against each other or when the water-repellent particles are irradiated with ultraviolet rays in the case where the desalination apparatus is installed outdoors.

In this manner, owing to the entry of the liquid from the surface of the particle layer 13a, an upper layer 13aa of the particle layer 13a sometimes gets wet with the liquid. In other words, the impurities may be present in the upper layer 13aa in the particle layer 13a.

Figure 8B:
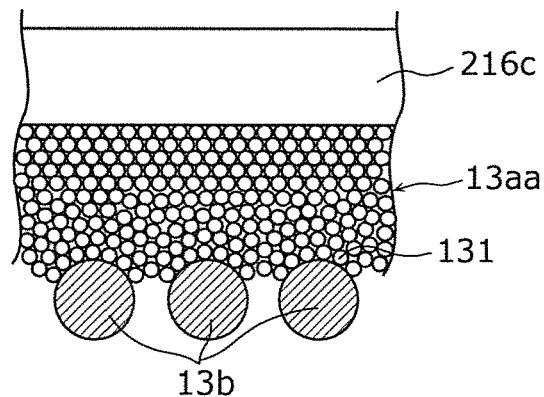
FIG. 8B is a drawing for detailing the process of collecting the impurities illustrated in (d) of FIG. 8A.

Accordingly, since the impurity collecting sheet 13b is disposed in the portion of the water-repellent particle layer 213 other than the surface portion, namely, in the inner portion of the particle layer 13a in the present embodiment, the upper layer 13aa (the layer that has gotten wet by the entry of the liquid) of the particle layer 13a is also collected together with the deposited impurities 216c when the impurity collecting sheet 13b is removed (see (d) of FIG. 8A). FIG. 8B is a drawing for detailing the process of collecting the impurities illustrated in (d) of FIG. 8A, and is an enlarged sectional view illustrating the deposited impurities 216c, the upper layer 13aa of the particle layer 13a, and the impurity collecting sheet 13b that have been removed from the desalination apparatus according to the present embodiment.

As mentioned in Embodiment 1, in the case where the impurities dissolved in the liquid to be introduced to the water tank 11 are deliquescent (where the liquid is seawater, for example), it may be also possible to evaporate or discharge moisture from the liquid layer 15 to dry the upper layer 13aa of the particle layer 13a when removing the impurity collecting sheet 13b illustrated in (d) of FIG. 8A. This can bind together the water-repellent particles 131 in the upper layer 13aa of the particle layer 13a and further bind the water-repellent particles 131 and the impurity collecting sheet 13b via the impurities in the liquid that has entered the upper layer 13aa, allowing the impurity collecting sheet 13b to be removed more easily.

As described above, compared with the desalination apparatus 10 according to Embodiment 1, the impurity collecting sheet 13b of the desalination apparatus according to the present embodiment is disposed in the portion of the water-repellent particle layer 213 other than the surface portion that faces the water tank 11. In other words, the impurity collecting sheet 13b is disposed in the inner portion of the particle layer 13a.

In this way, compared with the desalination apparatus 10 according to Embodiment 1, the desalination apparatus according to the present embodiment can suppress the possibility that the water-repellent particles to which the impurities adhere may remain in the desalination apparatus, making it possible to further suppress the decrease in the desalination efficiency.

More specifically, when the impurity collecting sheet 13b is removed from the desalination apparatus 10 according to Embodiment 1, the impurities 16c that have been deposited so as to cover the impurity collecting sheet 13b are removed as illustrated in (d) of FIG. 4A. In other words, the impurities 16c deposited below the impurity collecting sheet 13b are removed. At this time, there are some cases where a portion of water-repellent particles 131 in the particle layer 13a may be collected as illustrated in FIG. 4B. However, since the particle layer 13a is located below the impurity collecting sheet 13b, it is difficult to efficiently collect the portion that has gotten wet with the liquid from the particle layer 13a. In other words, the water-repellent particles 131 to which the impurities adhere remain in the particle layer 13a of the desalination apparatus 10 after the impurity collecting sheet 13b is removed.

Moreover, a portion of the impurities 16c deposited below the impurity collecting sheet 13b may sometimes peel off and fall down to the particle layer 13a.

In this manner, the water-repellent particles 131 that remain in the particle layer 13a and to which the impurities adhere and the impurities that have fallen down to the particle layer 13a may sometimes move to the inner portion of the particle layer 13a by the movement of the water-repellent particles 131. Consequently, there is a possibility that the desalination efficiency of the desalination apparatus 10 according to Embodiment 1 may decrease.

In contrast, when removing the impurity collecting sheet 13b in the desalination apparatus according to the present embodiment, the upper layer 13aa, which is the particle layer 13a that is located above the impurity collecting sheet 13b and has been gotten wet with the liquid, is removed together with the impurities 216c deposited on the surface of this upper layer 13aa as illustrated in (d) of FIG. 8A. In other words, the impurities 216c deposited above the impurity collecting sheet 13b are removed together with the upper layer 13aa of the water-repellent particle layer 13. This makes it possible to suppress the possibility that the water-repellent particles 131 to which the impurities adhere may remain in particle layer 13ab after removing the impurity collecting sheet 13b. Additionally, it becomes possible to suppress the possibility that the deposited impurities 216c may peel off.

Consequently, compared with the desalination apparatus 10 according to Embodiment 1, the desalination apparatus according to the present embodiment can further suppress the decrease in the desalination efficiency.

Embodiment 3

[Desalination System]

The desalination apparatus configured as above can be implemented not only as a device but also as a system. Hereinafter, an example of the desalination system in the present embodiment will be described with reference to FIG. 9.

Figure 9:
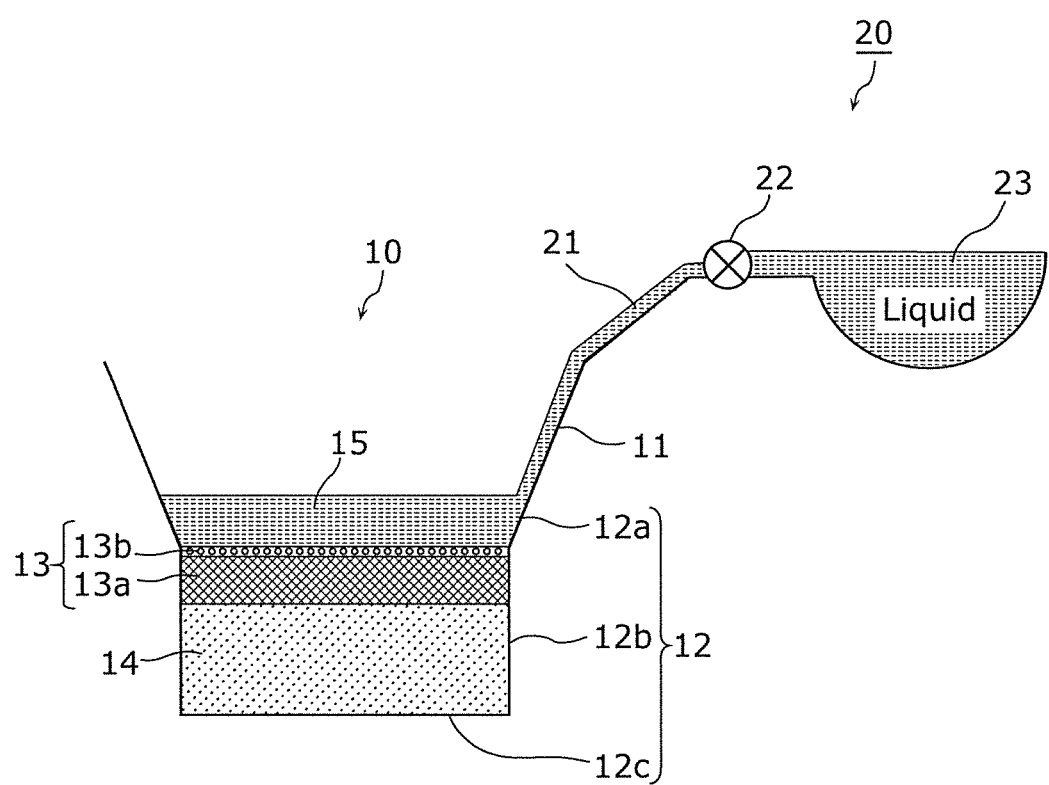
FIG. 9 is an example of a sectional view illustrating a configuration of a desalination system according to Embodiment 3.

FIG. 9 is an example of a sectional view illustrating a configuration of a desalination system according to Embodiment 3.

A desalination system 20 illustrated in FIG. 9 is, for example, a system that obtains fresh water from seawater, and includes the desalination apparatus 10 according to Embodiment 1 and a sluice gate 22. Structural elements similar to those in FIG. 2 are assigned the same reference signs, and the detailed description thereof will be omitted.

The sluice gate 22 is opened and closed so that the introduction of the liquid from the outside of the desalination apparatus 10 to the water tank 11 is started and stopped, respectively. More specifically, the sluice gate 22 is provided in an introduction passage 21, and regulates the amount of the liquid to be introduced to the water tank 11 (the introduction amount) via the introduction passage 21.

In an example illustrated by FIG. 9, the sluice gate 22 regulates the amount of flow of the liquid between the water tank 11 and an external tank 23 in which the liquid is stored. When the sluice gate 22 is opened, the liquid is introduced from the external tank 23 via the introduction passage 21 to the water tank 11. When the sluice gate 22 is closed, the introduction of the liquid from the external tank 23 via the introduction passage 21 to the water tank 11 is stopped. It should be noted that the opening and closing of the sluice gate 22 may be, for example, operated by a user or the like or, for example, controlled by a sluice gate control unit or the like.

The external tank 23 is, for example, the sea, a pretreatment tank that stores seawater introduced from the sea, or a tank that stores salt water supplied separately.

In the desalination system 20 configured as above, by removing the impurity collecting sheet 13b when the impurities are deposited, it is possible to suppress the decrease in the desalination efficiency. It should be noted that the desalination apparatus according to the present embodiment is not limited to have the configuration including the desalination apparatus 10 according to Embodiment 1 but may have the configuration including the desalination apparatus according to Variation of Embodiment 1 or according to Embodiment 2.

[Desalination Method]

The following description will be directed to a desalination process carried out by the desalination system 20 according to the present embodiment.

<Desalination Process>

Figure 10:
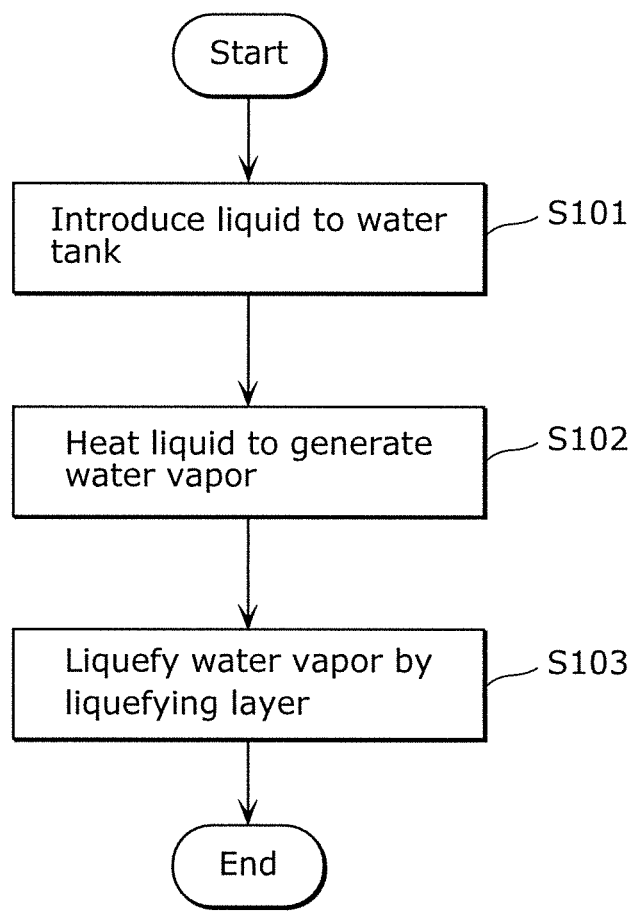
FIG. 10 is a flowchart illustrating steps of a desalination process of the desalination system.

FIG. 10 is a flowchart illustrating steps of the desalination process of the desalination system 20. It should be noted that the desalination process described in the following is not limited to the desalination process of the desalination system 20 but may be a desalination process of the desalination apparatus according to Embodiment 1, Variation of Embodiment 1, or Embodiment 2.

First, the liquid is introduced to the water tank 11, and placed above the water-repellent particle layer 13 (to serve as the liquid layer 15) (S101). Here, the liquid is, for example, salt water.

Incidentally, when the desalination process is carried out in the desalination system 20 shown in FIG. 9, the liquid is poured from the external tank 23 via the sluice gate 22 and the introduction passage 21 into the water tank 11, thus forming the liquid layer 15 on the upper surface of the water-repellent particle layer 13.

Next, by heating and evaporating the liquid placed above the water-repellent particle layer 13, the water vapor is generated (S102). More specifically, when the liquid stored in the water tank 11 (the liquid layer 15) is heated to a temperature higher than or equal to a certain temperature, the liquid turns to the water vapor.

Incidentally, the above-noted certain temperature is determined according to a saturation vapor pressure curve based on the kind of the liquid and atmospheric pressure. For example, when the liquid is salt water, the certain temperature is from 50° C. to 60° C. The liquid layer 15 may be heated, for example, by sunlight or by a heater if the water tank 11 includes the heater. Alternatively, the liquid layer 15 may be heated by supplying a heated object into the liquid layer 15 in the water tank 11.

Subsequently, the water vapor is liquefied by the liquefying layer 14, thereby obtaining the fresh water (S103).

More specifically, the water vapor obtained by heating and evaporating the liquid in the water tank 11 moves not only upward but also downward. When the water vapor moving downward passes through the gap between the water-repellent particles in the water-repellent particle layer 13 and reaches the liquefying layer 14, it is liquefied by the liquefying layer 14 to become liquid water. In other words, the water vapor obtained by heating and evaporating the liquid in the water tank 11 is cooled in the liquefying layer 14 to become liquid water.

In this manner, the desalination process of the desalination system 20 is performed.

It should be noted that the liquid water is water in which solids contained in the liquid that has been poured into the water tank 11 and impurities dissolved therein are reduced, and typically fresh water (distilled water). The impurities dissolved in the liquid are, for example, ions.

[Variation 1 of Embodiment 3]

Although the example of the desalination system has been described with reference to FIG. 9 in Embodiment 3, the desalination system is not limited to the example illustrated in FIG. 9. Another example of the desalination system will be described as Variation 1.

Figure 11:
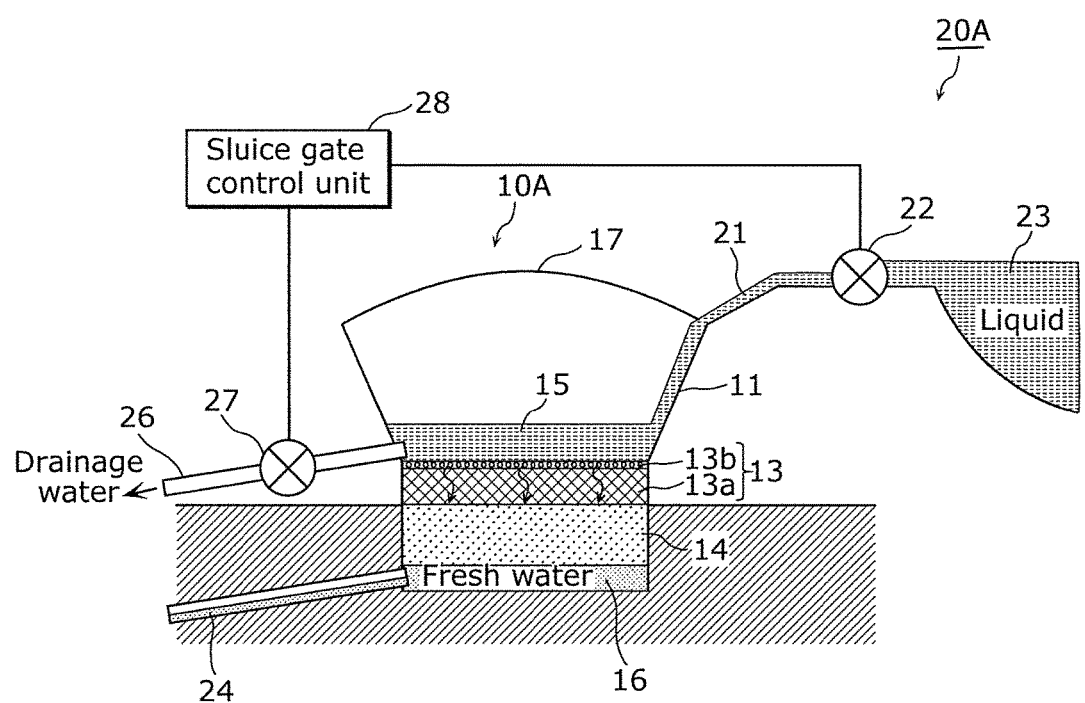
FIG. 11 is an example of a sectional view illustrating a configuration of a desalination system in Variation 1 of Embodiment 3.

FIG. 11 is an example of a sectional view illustrating a configuration of a desalination system in Variation 1 of Embodiment 3.

A desalination system 20A illustrated in FIG. 11 obtains fresh water from seawater, for example, and includes a desalination apparatus 10A, an introduction passage 21, a sluice gate 22, an external tank 23, a fresh water passage 24, a discharge pipe 26, a discharge valve 27 and a sluice gate control unit 28. Structural elements similar to those in FIG. 9 are assigned the same reference signs, and the detailed description thereof will be omitted.

The desalination apparatus 10A includes a lid 17 unlike the desalination apparatus 10 illustrated in FIG. 9. Since other configurations are similar to those of the desalination apparatus 10, the description thereof will be omitted.

The lid 17 is provided in the water tank 11, and covers an opening of the water tank 11 (the upper side wall 12a). The lid 17 is formed of a transparent member when the liquid layer 15 of the desalination apparatus 10A is heated by sunlight. The desalination apparatus 10A includes the lid 17, whereby it is possible to not only reduce the water vapor upwardly escaping from the water tank 11 but also reduce the impurities entering through the opening of the water tank 11.

The fresh water passage 24 is connected with the liquefying layer 14, and discharges the fresh water (distilled water) from the liquefying layer 14 to the outside. Incidentally, the fresh water passage 24 may be provided with a fresh water discharge valve (not shown). In that case, the fresh water discharge valve is opened so as to discharge fresh water (distilled water) from the liquefying layer 14 via the fresh water passage 24 to the outside, whereas the fresh water discharge valve is closed so as to stop discharging the fresh water (distilled water) from the liquefying layer 14. It should be noted that the opening and closing of the fresh water discharge valve may be controlled by the sluice gate control unit 28.

The discharge pipe 26 is connected with the water tank 11, and discharges the liquid from the liquid layer 15 to the outside.

The discharge valve 27 is provided in the discharge pipe 26. The discharge valve 27 is opened so as to discharge the liquid from the liquid layer 15 in the water tank 11, and closed so as to stop discharging the liquid from the liquid layer 15 in the water tank 11. The opening and closing of the discharge valve 27 are controlled by the sluice gate control unit 28.

The sluice gate control unit 28 may control the opening and closing of the sluice gate 22, the discharge valve 27 and so on according to information inputted by a user or the like utilizing an input unit (not shown). Here, the input unit is, for example, a touch panel, a keyboard, a cursor, a microphone or the like. Also, the information to be inputted to the input unit by the user or the like is, for example, information indicating an instruction to open the sluice gate 22 or information indicating an instruction to close the sluice gate 22.

Figure 12:
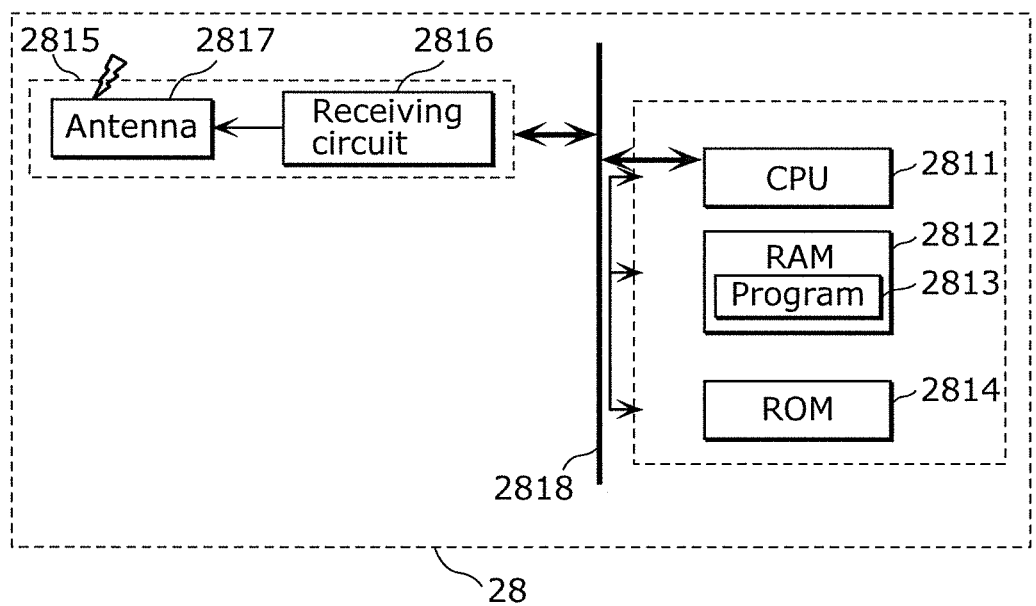
FIG. 12 is a block diagram illustrating an example of a hardware configuration of a sluice gate control unit in Variation 1 of Embodiment 3.

FIG. 12 is a block diagram illustrating an example of a hardware configuration of the sluice gate control unit 28 in Variation 1 of Embodiment 3.

As shown in FIG. 12, the sluice gate control unit 28 includes, for example, a CPU 2811, a RAM 2812, a ROM 2814, a receiving unit 2815 and a bus 2818.

The CPU 2811 executes a program 2813 stored in the RAM 2812. In the program 2813, procedures in FIG. 10 explained above are described, for example. It is noted that the program 2813 may be stored in the ROM 2814.

The receiving unit 2815 includes an antenna 2817 and a receiving circuit 2816, and receives information indicating opening/closing of the sluice gate, etc. For example, when the user or the like inputs the information to the input unit, the information is transmitted from the antenna 2817 provided in the input unit. In that case, in the sluice gate control unit 28, the transmitted information is received by the antenna 2817 and accepted by the receiving circuit 2816.

The receiving circuit 2816 and the CPU 2811 are connected to each other via the bus 2818, and can mutually transfer data. The information accepted by the receiving unit 2815, namely, the receiving circuit 2816 is transmitted to the CPU 2811 via the bus 2818.

In the desalination system 20A configured as above, it is possible to regulate the amount of water to be introduced (flow of water). Thus, the breach of the water-repellent particle layer 13 caused by the water flow can be suppressed.

[Variation 2 of Embodiment 3]
[Desalination System]

The desalination system may further include a determining unit that determines whether or not the impurities are deposited on the surface of the water-repellent particle layer 13.

Figure 13:
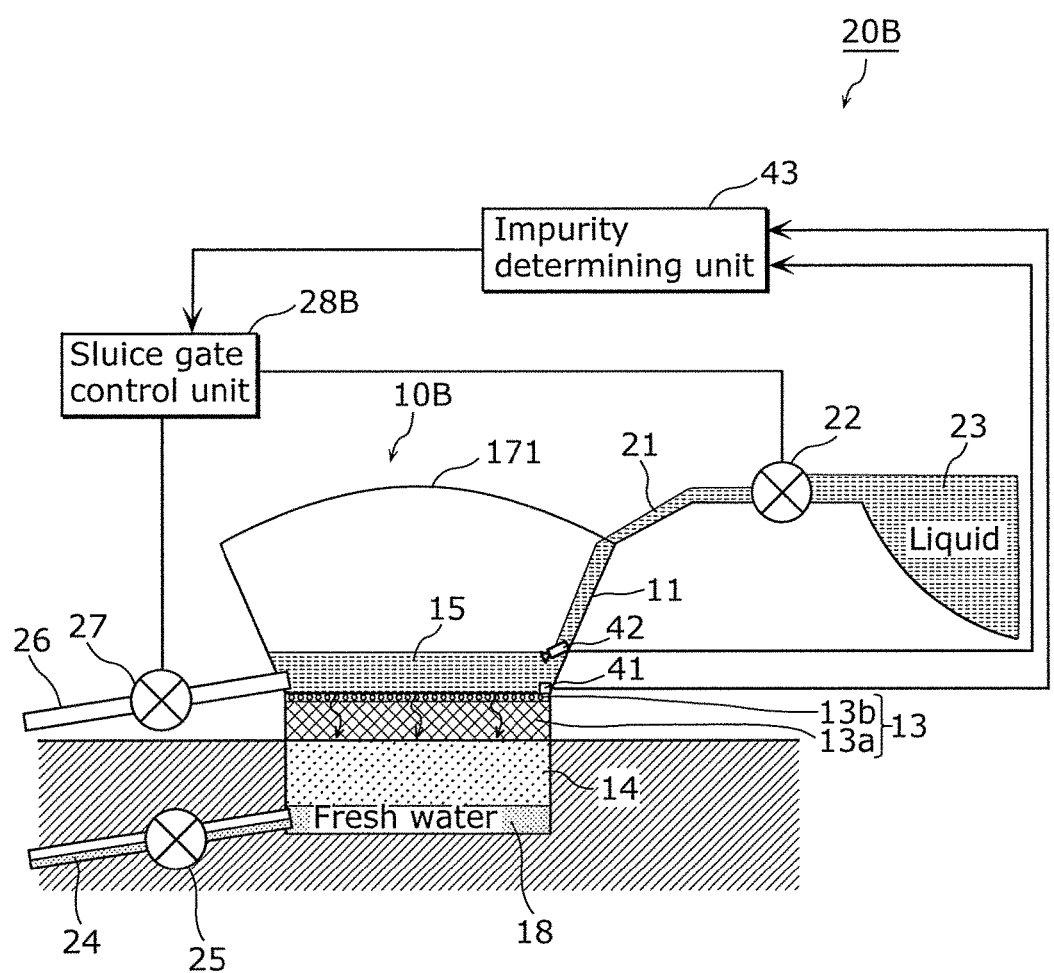
FIG. 13 is an example of a sectional view illustrating a configuration of a desalination system in Variation 2 of Embodiment 3.

FIG. 13 is an example of a sectional view illustrating a configuration of a desalination system 20B in Variation 2 of Embodiment 3.

As illustrated in this figure, the desalination system 20B according to the present variation includes the desalination apparatus 10B, which is a variation of the desalination apparatus 10A, and an impurity determining unit 43 (the determining unit). The desalination apparatus 10B is substantially the same as the desalination apparatus 10A but is different in that it further includes a concentration measuring unit 41 and an imaging unit 42. The impurity determining unit 43 is connected to the concentration measuring unit 41 and the imaging unit 42 either wirelessly or by wire. The following is a specific description of each structural component.

The concentration measuring unit 41 measures the concentration of the liquid in the liquid layer 15. The concentration measuring unit 41 may obtain a time of day from a time measurement unit for measuring a time of day, and transmit the measured concentration to the impurity determining unit 43 in association with the time of day.

Figure 14:
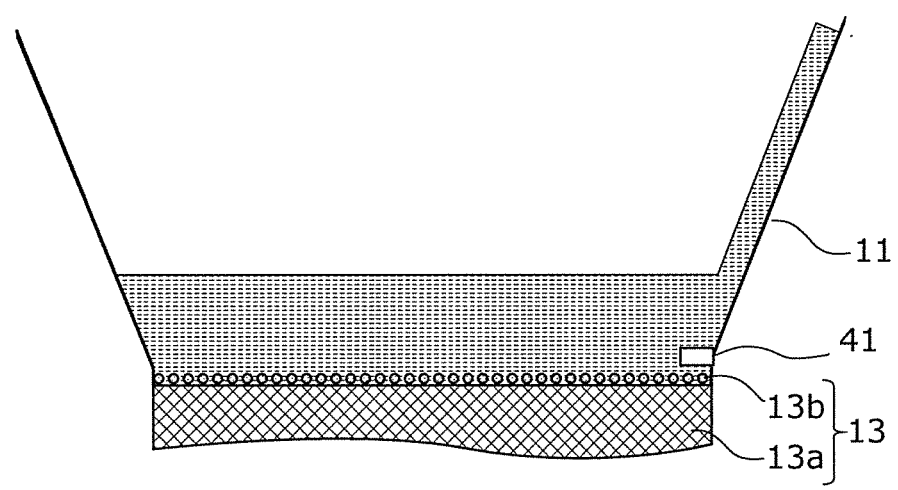
FIG. 14 is an enlarged sectional view illustrating an exemplary configuration of a desalination system, in particular, illustrating an arrangement example of a concentration measuring unit.

The concentration measuring unit 41 is disposed inside the water tank 11 and inside the liquid layer 15. FIG. 14 illustrates an example in which the concentration measuring unit 41 is disposed in the liquid layer 15. The liquid in the liquid layer 15 located near the water-repellent particle layer 13 has the highest impurity concentration. Thus, it is appropriate that the concentration measuring unit 41 be disposed near the water-repellent particle layer 13. For example, the concentration measuring unit 41 is disposed in contact with the water-repellent particle layer 13.

The imaging unit 42 captures an image of the surface of the water-repellent particle layer 13. The imaging unit 42 may obtain a time of day from the time measurement unit for measuring a time of day, and transmit the measured image to the impurity determining unit 43 in association with the time of day.

Figure 15:
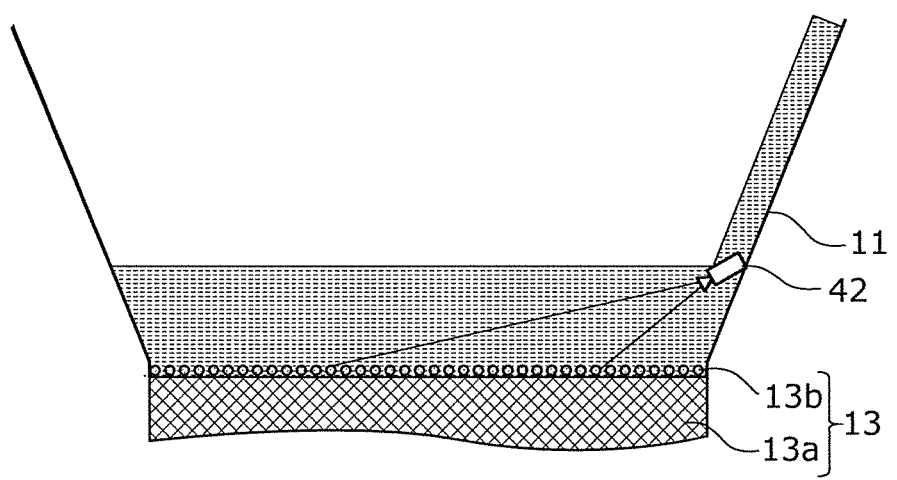
FIG. 15 is an enlarged sectional view illustrating an exemplary configuration of a desalination system, in particular, illustrating an arrangement example of an imaging unit.

The imaging unit 42 is disposed so as to capture an image of the surface of the water-repellent particle layer 13. FIG. 15 illustrates an example in which the imaging unit 42 is disposed in the liquid layer 15. In order to reduce an influence of light reflected by the surface of the liquid layer 15, it is appropriate that the imaging unit 42 be disposed inside the liquid layer 15.

The impurity determining unit 43 determines whether or not the impurities dissolved in the liquid are deposited on the water-repellent particle layer 13.

The impurity determining unit 43 determines whether or not the concentration measured by the concentration measuring unit 41 falls within a predetermined concentration range. If the measured concentration falls within the predetermined concentration range, it is determined that the impurities are deposited. If the measured concentration does not fall within the predetermined concentration range, it is determined that no impurities are deposited. The predetermined concentration range is from a concentration lower than a saturation concentration by a predetermined amount to the saturation concentration. The predetermined concentration range may be, for example, from a concentration 3% lower than the saturation concentration to the saturation concentration.

Furthermore, if the concentration of the liquid in the liquid layer 15 falls within the predetermined concentration range for a predefined period or longer, the impurity determining unit 43 may determine that the impurities are deposited. In addition to information about whether or not the impurities are deposited, it may also be possible to determine an amount of deposited impurities based on the length of the predefined period.

The impurity determining unit 43 obtains the predetermined concentration range stored in a reference storing unit. The impurity determining unit 43 may include a reference storing unit, or may obtain the predetermined concentration range from an external reference storing unit. The reference storing unit may store the predefined period in addition to the predetermined concentration range.

The impurity determining unit 43 determines whether or not the impurities are deposited based on the image captured by the imaging unit 42. Whether or not the impurities are deposited is determined based on whether or not the color of the impurities dissolved in the liquid in advance is identified in the captured image. When the impurities and the water-repellent particles have the same color, it may also be possible to use brightness information.

It should be noted that the amount of deposited impurities may be determined based on an amount of the impurities identified in the captured image. The amount of the impurities identified in the captured image may be a ratio or an area of the impurities in the image.

The impurity determining unit 43 obtains predetermined impurity color or brightness stored in a reference storing unit. The impurity determining unit 43 may include a reference storing unit, or may obtain the predetermined impurity color or brightness in the image from an external reference storing unit. The reference storing unit may store the predefined ratio or area of the impurities in addition to the predetermined color or brightness of the impurities.

Moreover, if the impurity determining unit 43 determines that the impurities are deposited, it may transmit information indicating that the impurities are deposited to the sluice gate control unit 28B, and the sluice gate control unit 28B may close the sluice gate 22 and open the discharge valve 27, thereby discharging the liquid (from the liquid layer 15). In this manner, even in the case where the dissolved impurities are deliquescent (where the liquid is seawater, for example), it is possible to dry the deposited impurities, allowing easier collection.

As described above, the desalination system 20B according to the present variation includes the impurity determining unit 43 that determines whether or not the impurities are deposited on the surface of the water-repellent particle layer 13. In this manner, by determining that the impurities are deposited, timing of removing the impurity collecting sheet 13b can be detected. Thus, it becomes possible to collect the impurity collecting sheet 13b at appropriate timing, thus suppressing the decrease in the desalination efficiency.

[Method for Collecting Impurities]

In the desalination system 20B having the configuration described above, an impurity collecting process described in the following may be carried out sequentially or in parallel with the above-described desalination process.

Figure 16:
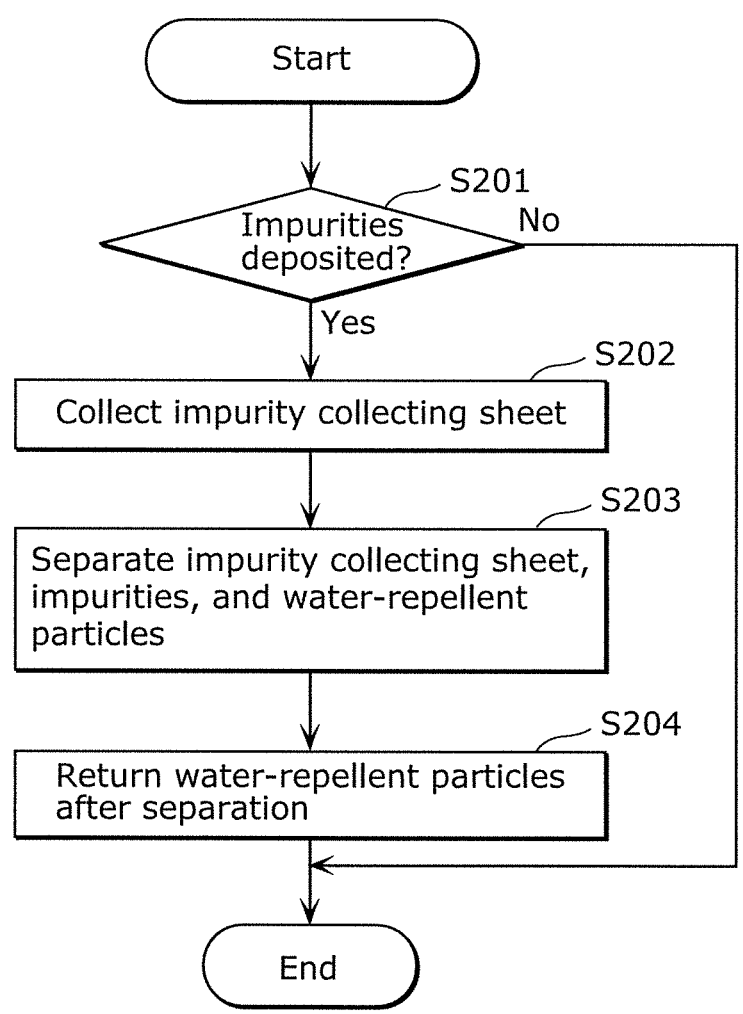
FIG. 16 is a flowchart illustrating steps of an impurity collecting process.

FIG. 16 is a flowchart illustrating steps of the impurity collecting process for collecting the impurities deposited on the water-repellent particle layer 13.

First, the impurity determining unit 43 determines whether or not the impurities are deposited on the water-repellent particle layer 13 (S201). More specifically, the impurity determining unit 43 determines whether or not the concentration measured by the concentration measuring unit 41 falls within the predetermined concentration range or whether or not the impurities are identified based on the image captured by the imaging unit 42.

If the impurity determining unit 43 determines that the impurities are deposited (Yes in S201), the impurity collecting sheet 13b is collected (S202). On the other hand, if the impurity determining unit 43 determines that no impurities are deposited (No in S201), the impurity collecting process is ended.

In the process of collecting the impurity collecting sheet 13b (S202), the impurity collecting sheet 13b may be collected by a person who lifts up an extraction jig attached to the impurity collecting sheet 13b, or by a machine which lifts up the impurity collecting sheet 13b.

Here, in the desalination system 20B according to the present embodiment, the impurity collecting sheet 13b is disposed in the surface portion of the water-repellent particle layer 13. Thus, as described with reference to FIGS. 4A and 4B in Embodiment 1, in this process of collecting the impurity collecting sheet 13b (S202), the impurity collecting sheet 13b and the impurities 16c that are deposited so as to contain the impurity collecting sheet 13b are removed. In other words, the impurities 16c deposited below the impurity collecting sheet 13b are removed.

Incidentally, when the impurity collecting sheet 13b is disposed in the inner portion of the water-repellent particle layer 213 as in the desalination apparatus according to Embodiment 2, the deposited impurities are collected as follows. That is, as described with reference to FIGS. 8A and 8B in Embodiment 2, in the process of collecting the impurity collecting sheet 13b (S202), the impurity collecting sheet 13b, the plurality of water-repellent particles 131 that are in the water-repellent particle layer 13 and located above the impurity collecting sheet, and the impurities 216c deposited on the water-repellent particle layer 13 are removed.

After the impurity collecting process (S202), an integrated body of the impurities, the water-repellent particles, and impurity collecting sheet 13b that are collected is washed, whereby the impurities, the water-repellent particles, and impurity collecting sheet 13b are separated (S203).

Thereafter, the water-repellent particles from which the impurities are removed are returned to the desalination apparatus 10B (S204), and the impurity collecting process is ended.

In this manner, the desalination system 20B according to the present variation can determine that the impurities are deposited, thereby detecting timing of removing the impurity collecting sheet 13b. Thus, it becomes possible to collect the impurity collecting sheet 13b at appropriate timing, thus suppressing the decrease in the desalination efficiency.

It should be noted that, in the step of returning the water-repellent particles (S204), the impurity collecting sheet 13b that is collected in the impurity collecting process (S202) and from which the impurities and the water-repellent particles are removed, namely, the impurity collecting sheet 13b to which no impurities or water-repellent particles adhere may be also returned to the desalination apparatus 10B.

Although the desalination apparatus, the desalination system including the same, and the desalination method according to one or more aspects have been described based on the embodiments and variations, the present disclosure is not limited to these embodiments and variations. As long as not departing from the purport of the present disclosure, many variations of the above embodiment and variation conceivable by a person skilled in the art and modes configured by the combination of the structural components in different embodiments and variations may be included in the scope of one or more aspects of the present disclosure.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the desalination apparatus according to each of the embodiments is a program described below.

The herein disclosed subject matter is to be considered descriptive and illustrative only, and the appended Claims are of a scope intended to cover and encompass not only the particular embodiments disclosed, but also equivalent structures, methods, and/or uses.

INDUSTRIAL APPLICABILITY

The present disclosure is applicable to an apparatus or a system that desalinates a liquid.

The invention claimed is:

1. A desalination method for obtaining fresh water from a liquid using a desalination apparatus that obtains fresh water from a liquid in which impurities are dissolved, the desalination apparatus including:
   a tank for storing a liquid in a reservoir layer;
   a lid on an opening of the tank;
   a water-repellent particle layer that is located at a bottom portion of the tank, the water repellent particle layer including a plurality of water-repellent particles that allow passage of water vapor generated by evaporation of the liquid stored in the reservoir layer, the reservoir layer being a space for storing the liquid;
   a plurality of particles forming a liquefying layer that is located below the water-repellent particle layer, the liquefying layer being capable of liquefying the water vapor that has passed through the water-repellent particle layer to obtain the fresh water; and
   a sheet that is disposed in a surface portion of the water-repellent particle layer, and has water permeability; the desalination method comprising:
   introducing the liquid to the reservoir layer to place the liquid above the water-repellent particle layer;
   heating and evaporating the liquid placed above the water-repellent particle layer to generate water vapor and deposit the impurities on the sheet;
   liquefying the water vapor by the liquefying layer to obtain the fresh water;
   and
   removing the sheet on which the impurities have been deposited from the desalination apparatus.

2. The desalination method according to claim 1, wherein, in the removing of the sheet from the desalination apparatus, the sheet and the impurities that have been deposited below the sheet are removed.

3. The desalination method according to claim 1, wherein, in the removing of the sheet from the desalination apparatus, the sheet, the plurality of water-repellent particles included in the water-repellent particle layer and located above the sheet, and the impurities that have been deposited on the water-repellent particle layer are removed.

4. A desalination method for obtaining fresh water from a liquid using a desalination apparatus that obtains fresh water from a liquid in which impurities are dissolved, the desalination apparatus including:

a tank for storing a liquid in a reservoir layer;

a lid on an opening of the tank;

a water-repellent particle layer that is located at a bottom portion of the tank, the water repellent particle layer including a plurality of water-repellent particles that allow passage of water vapor generated by evaporation of the liquid stored in the reservoir layer, the reservoir layer being a space for storing the liquid;

a sheet that is disposed below the water-repellent particle layer, and has water permeability;

a lower water-repellent particle layer that is located below the sheet, the lower water repellent particle layer including a plurality of water-repellent particles that allow the passage of the water vapor generated by the evaporation of the liquid stored in the reservoir layer; and a plurality of particles forming a liquefying layer that is located below the lower water-repellent particle layer, the liquefying layer being capable of liquefying the water vapor that has passed through the water-repellent particle layer to obtain the fresh water, the desalination method comprising:

introducing the liquid to the reservoir layer to place the liquid above the water-repellent particle layer;

heating and evaporating the liquid placed above the water-repellent particle layer to generate water vapor and deposit the impurities on the sheet;

liquefying the water vapor by the liquefying layer to obtain the fresh water;

and removing the sheet on which the impurities have been deposited from the desalination apparatus.

5. The desalination method according to claim 4, wherein, in the removing of the sheet from the desalination apparatus, the sheet and the impurities that have been deposited below the sheet are removed.

6. The desalination method according to claim 4, wherein, in the removing of the sheet from the desalination apparatus, the sheet, the plurality of water-repellent particles included in the water-repellent particle layer and located above the sheet, and the impurities that have been deposited on the water-repellent particle layer are removed.

* * * * *